Oct. 30, 1928.
G. HALTER
1,689,201
CONVEYER OPERATED AT ACCELERATED SPEED
Filed June 12, 1923  2 Sheets-Sheet 1
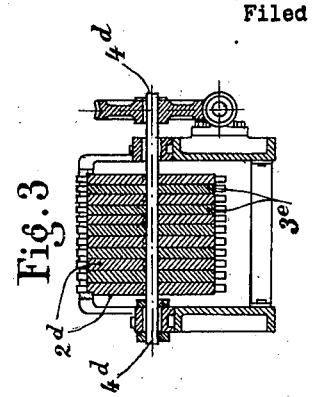
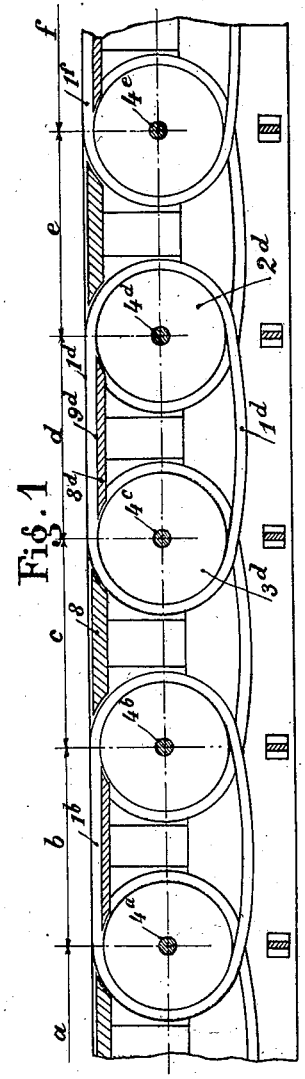
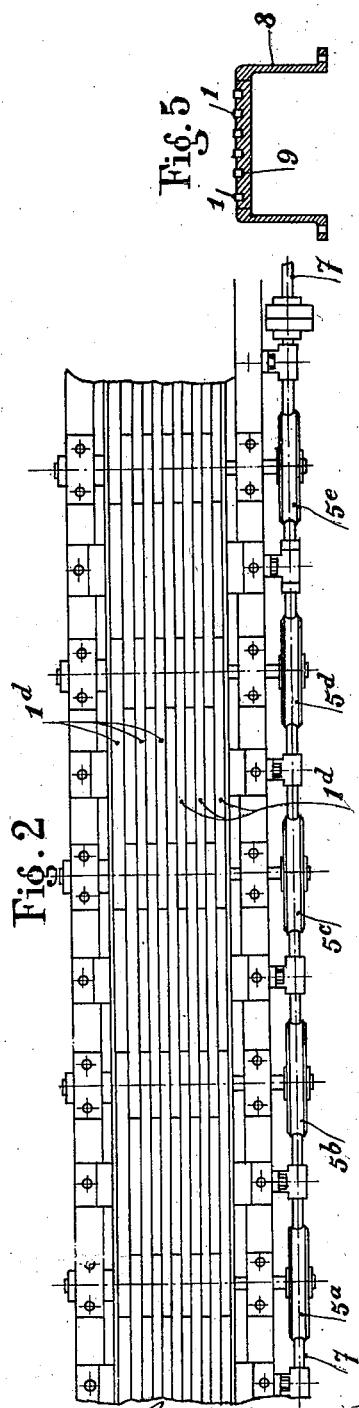

Oct. 30, 1928.
G. HALTER
1,689,201
CONVEYER OPERATED AT ACCELERATED SPEED
Filed June 12, 1923   2 Sheets-Sheet 2
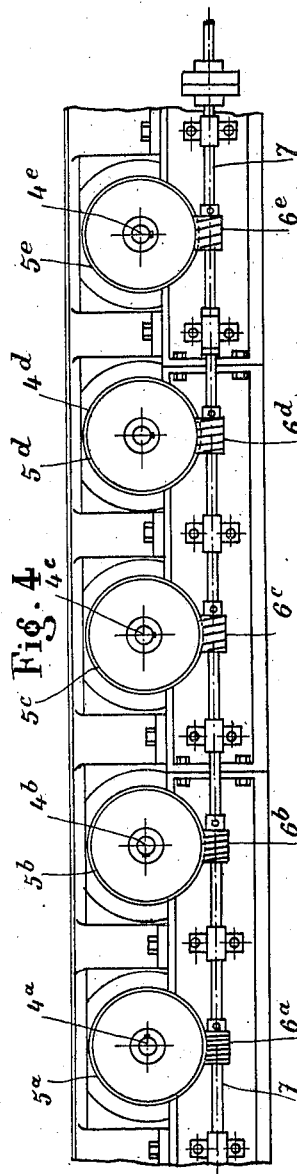
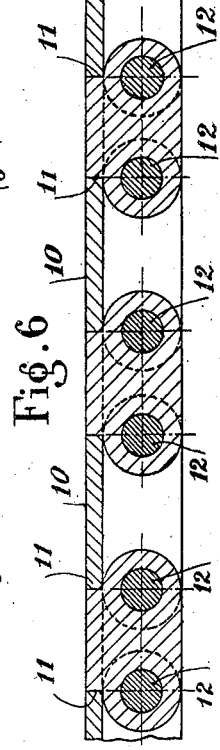
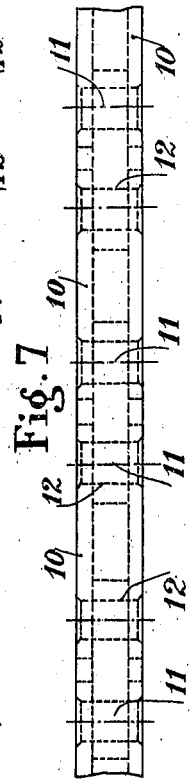
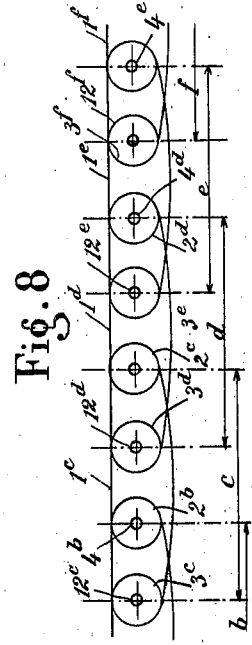

Patented Oct. 30, 1928.

1,689,201

UNITED STATES PATENT OFFICE.

GEORGES HALTER, OF PARIS, FRANCE.

CONVEYER OPERATED AT ACCELERATED SPEED.

Application filed June 12, 1923, Serial No. 645,001, and in France June 17, 1922.

My invention relates to transporting apparatus which serves to convey from one place to another situated at the same or at different levels, various goods, heavy objects or persons whereby the same shall be caused to travel at increasing or decreasing speeds. For this purpose the said apparatus comprises various sections disposed in sequence according to the direction of travel of the load and having distinct rates of speed which increase or decrease from one element to another, the speeds of successive sections being thus positively or negatively accelerated. The load is placed, or places itself automatically, upon the section having the slowest speed in the case of increasing speeds, and upon the section having the highest speed in the case of decreasing speeds.

Such apparatus may be combined with endless platforms which are operated in a continuous manner and at a uniform speed, and may be used for access to the same or as a discharge therefrom, or in other cases as an apparatus for handling goods wherein various speeds are required to transport the load.

The sections operated at increasing speeds and the sections operated at decreasing speeds, the object of my invention, can be constructed in like manner.

Each transporting section of the series proceeding in the direction of travel of the load comprises a series of endless funicular elements in parallel disposition which are mounted upon pulleys disposed on two shafts whereof one is a driving shaft and the other serves solely to guide and to support the said elements, the upper part of the said elements situated between these two shafts serving to support as well as to displace the loads to be carried, and further, when passing upon the driving pulleys, the funicular elements of a given section are imbricated with the elements of the succeeding section, so that in the whole combination of the said sections the parts of the elements supporting the loads will form a continuous surface having no projections nor depressions and especially as concerns the passage from one section to the next; this imbricated arrangement of the various sections can be carried out by the use of various forms of construction, and according to one form, the driving shaft of each section serves at the same time as an axle for the supporting and guiding pulleys of the elements of the succeeding section, the said pulleys being loose upon the shaft; in a second form of construction the driving shaft and the supporting shaft of each section are distinct from the shafts of the adjacent sections and the device comprises between the driving shafts of two adjacent sections the supporting shaft of the section which follows the two sections above mentioned in the direction of travel of the load.

The successive driving shafts are actuated at various speeds which increase (or decrease) from one shaft to the next, and the said speeds can be provided for by any suitable means; for example each shaft may be driven by a separate motor which is independent of the motors driving the other shafts, and the motors can be provided with speed regulating means controlled by the same device which serves to change the speed of all the driving shafts at will and in the same direction, or in other cases all the driving shafts may be actuated by a single motor, being connected therewith by suitable power transmission means whereby the said shafts may be driven at speeds which increase (or decrease) from one shaft to the next.

The elements of each section may be constituted by belts, chains and the like; the carrying strands of said elements may be supported by frames or like devices which are disposed thereunder or in other cases where chains are used, the links of the chains may have a projecting part whereby each link may press against the succeeding link.

The appended drawings, which are of a diagrammatic nature and are in no wise limitative, relate to an apparatus representing an embodiment of the above-mentioned principles.

Fig. 1 is a longitudinal section and Fig. 2 a plan view of a transporting apparatus wherein each driving shaft of a section is used as a supporting shaft for the guiding pulleys of the funicular elements of the succeeding section.

Fig. 3 is a section on the axis of the driving shaft of a section as shewn in Figs. 1 and 2. Fig. 4 is an elevational view of a controlling mechanism which is common to various sections of the device shewn in the preceding figures.

Fig. 5 is a section of a supporting frame taken between two successive driving shafts.

Fig. 6 is a longitudinal section of a funicular element of a section which has the form of a chain.

Fig. 7 is a plan view of the said chain.

Fig. 8 is a diagrammatic elevational view of an apparatus wherein each section comprises a driving shaft and a supporting shaft which are distinct from those of the other sections.

The transporting sections $a\ b\ c\ d\ e\ f\ \ldots$ are disposed in sequence in the direction of travel of the load. Each section, $d$, for instance, comprises a plurality of endless funicular elements $1^d$ in parallel position which are disposed upon two sets of pulleys $2^d$, $3^d$ mounted upon shafts $4^d$, $4^e$ whereof $4^d$ is the driving shaft and has keyed thereto the set of pulleys $2^d$ actuating the funicular elements of the said transporting section, and has mounted loose upon the same the set of pulleys $3^e$ supporting the funicular elements of the succeeding transporting section $e$, the shaft $4^e$ having mounted loose thereon the set of pulleys $3^d$ supporting the funicular elements of the same transporting section, and keyed thereto the set of pulleys $2^e$ actuating the funicular elements of the preceding transporting section $c$; the keyed pulleys $2^d$ of a given transporting section $d$ are in alternate disposition on the driving shaft $4^d$ with the loose pulleys $3^e$ of the succeeding transporting section, Fig. 3, thus insuring the imbrication of the elements $1^d$ of a section $d$ and the elements $1^e$ of the succeeding section $e$, the number of pulleys in each of the said sections being equal to number of funicular elements in the corresponding transporting section.

The successive driving shafts $4^a$, $4^b$, $\ldots$ $4^d$, $4^e$, $4^f$ $\ldots$ are actuated at different speeds increasing or decreasing from one shaft to the next, and herein the device is actuated by the worm wheels $5^a$, $5^b$, $5^c$, $5^d$, $5^e$, $5^f$ $\ldots$ which are keyed respectively to the various shafts and respectively engage the worms $6^a$, $6^b$, $6^c$ $\ldots$ $6^f$ $\ldots$ mounted upon a common shaft 7. The pitch of the said worm gearing (while having the same direction) increases from the first to the last gears, so that a given shaft $4^d$ will rotate at a greater speed than the preceding shaft $4^c$ and at a slower speed than the succeeding shaft $4^e$; the last shaft of the arrangement rotates at the maximum speed and actuates the elements of the last section at a speed which is equal to the speed of the main traveling platform along which the said apparatus is mounted in order to afford access to the same or discharge therefrom.

The endless funicular elements $1^a$, $1^b$, $\ldots$ $1^e$ $\ldots$ may consist of belts, chains or the like; in the case of belts, the pulleys $2^a$, $2^b$ etc. $3^a$, $3^b$, etc., are smooth, but where chains are used, the faces of said pulleys are provided with teeth corresponding to the links of the chains employed.

The loads are disposed upon the funicular elements of the sections, and the latter are supported in any suitable manner upon the whole distance between the fixed and loose pulleys whereon they are mounted, for example by means of a supporting frame 8, Fig. 5, provided with grooves 9 containing the said elements, the latter being made to project somewhat above the said support so that the loads may rest directly upon the said elements and without contact with the said frame, or suitable rollers can also be used for the same purpose. But the said supporting elements may be eliminated by the use of chains for the funicular elements whereof each link 10 has a projection 11 coming into contact with the adjacent link when the said chain is stretched, Fig. 7, the axles 12 of said links being strong enough to support the weight of the loads.

Irrespectively of the form of construction of the funicular elements $1^a$, $1^b$ etc., it is observed that the said elements constitute as a whole a continuous transporting device and that the loads placed upon the said elements will proceed automatically from one section to the next. Since any desired number of sections may be employed, my invention provides in a safe and convenient manner for all desired variations of speed between the first and last sections.

In Fig. 8, in each section $d$, for example, the elements are mounted upon driving pulleys $2^d$ and upon supporting pulleys $3^d$, but in this case the driving shaft $4^d$ of the section $d$ only carries the said driving pulleys, the supporting pulleys $3^d$ being mounted on a shaft $12^d$ which is distinct from the driving shaft $4^e$; on each driving shaft 4 and 12 the various pulleys 2 and 3 may be combined in one in order to form a single drum whereon are disposed all the elements of a given section.

I declare that what I claim is:

1. In a transporting apparatus comprising a series of endless transporting sections disposed in sequence in the direction of travel of the load and wherein each section consists of a plurality of endless funicular elements arranged in parallel position, imbricated with the funicular elements of the adjacent sections and forming with the same a continuous surface of travel for the load, pulleys on which said funicular elements are mounted, a driving shaft for each section, the combination of the drive shafts of all the sections with rigid driving connections controlled by a single device and actuating the successive sections as a whole in the same direction at speeds which are accelerated from one section to the next.

2. A transporting apparatus comprising a series of endless transporting sections disposed in sequence in the direction of travel of the load and wherein each section consists of endless funicular elements arranged in parallel position, and imbricated with the funicular elements of the adjacent sections, a pair of shafts spaced in the direction of travel of said machine for each section, fast and loose pulleys alternating on each shaft of each pair, the odd pulleys on one being fast and the odd pulleys on the other being loose, each funicular element being mounted on one of said pairs of pulleys, each such shaft being a drive shaft for one of said sections and merely a supporting shaft for the adjacent section, and means common to said shafts for driving them at speeds accelerated from one to the next.

3. In a transporting apparatus comprising a series of endless transporting sections disposed in sequence in the direction of travel of the load and wherein each section consists of a plurality of endless funicular elements arranged in parallel position, imbricated with the funicular elements of the adjacent sections, pulleys on which said funicular elements are mounted, a common drive shaft for said pulleys, two shafts for each section spaced in the direction of travel and on which said pulleys are respectively mounted one of said shafts being the driving shaft and having fast thereon the set of pulleys actuating the funicular elements of the said transporting section, and loose thereon the set of pulleys supporting the funicular elements of the succeeding transporting section, the second shaft having loose upon the same the set of pulleys supporting the funicular elements of the same transporting section and fast thereon the set of pulleys actuating the funicular elements of the preceding transporting section, the fixed pulleys of a given transporting section being caused to alternate upon the driving shaft of said section with the loose pulleys of the succeeding transporting section, and driving means combined with the driving shafts whereby the same shall be simultaneously operated at speeds accelerated from one section to the next.

4. In a transporting apparatus comprising a series of endless transporting sections disposed in sequence in the direction of travel of the load and wherein each section consists of a plurality of endless funicular elements arranged in parallel position, imbricated with the funicular elements of the adjacent sections, pulleys on which said funicular elements are mounted, a common drive shaft for said pulleys, two shafts for each section spaced in the direction of travel and on which said pulleys are respectively mounted one of said shafts being the driving shaft and having fast thereon the set of pulleys actuating the funicular elements of the said transporting section, and having loose upon the same the set of pulleys supporting the funicular elements of the succeeding transporting section, the second shaft having loose upon the same the set of pulleys supporting the funicular elements of the same transporting section and fast thereon the set of pulleys actuating the funicular elements of the preceding transporting section, the fixed pulleys of a given transporting section being caused to alternate upon the driving shaft of said section with the loose pulleys of the succeeding transporting section, gearing mounted upon the successive driving shafts, and a single motor actuating said gearing and which operates simultaneously the said shafts at speeds accelerated from one section to the next.

5. In apparatus for transporting human passengers for use in association with a high speed endless platform, a series of endless transporting sections disposed in sequence in the direction of travel of the load and wherein each section consists of a plurality of endless funicular elements arranged in parallel position, imbricated with the funicular elements of adjacent sections and forming with the same a continuous surface of travel for the passengers, said funicular elements being located close together and the space between adjacent funicular elements crosswise of the section being narrow to that end, pulleys on which said funicular elements are disposed, and inter-related means for actuating the successive sections in the same direction at speeds which are accelerated from one section to the next.

In witness whereof I have hereunto set my hand.

GEORGES HALTER.